(12) United States Patent
Clark et al.

(10) Patent No.: US 10,590,778 B2
(45) Date of Patent: Mar. 17, 2020

(54) ENGINE COMPONENT WITH NON-UNIFORM CHEVRON PINS

(71) Applicant: General Electric Company, Schenectady, NY (US)

(72) Inventors: Emily Rosette Clark, Cincinnati, OH (US); Weston Nolan Dooley, West Chester, OH (US); Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 15/667,787

(22) Filed: Aug. 3, 2017

(65) Prior Publication Data

US 2019/0040748 A1    Feb. 7, 2019

(51) Int. Cl.
*F01D 5/18*     (2006.01)
*F01D 9/04*     (2006.01)
*F01D 25/12*    (2006.01)

(52) U.S. Cl.
CPC ............. *F01D 5/187* (2013.01); *F01D 9/041* (2013.01); *F01D 25/12* (2013.01); *F05D 2220/323* (2013.01); *F05D 2240/11* (2013.01); *F05D 2240/128* (2013.01); *F05D 2240/30* (2013.01); *F05D 2240/35* (2013.01); *F05D 2260/2212* (2013.01); *F05D 2260/2214* (2013.01); *F05D 2260/22141* (2013.01)

(58) Field of Classification Search
CPC .......... F01D 5/187; F01D 9/041; F01D 25/12; F05D 2260/22141; F05D 2260/2214; F05D 2240/30; F05D 2220/323; F05D 2240/128; F05D 2260/2212; F05D 2240/11; F05D 2240/35

USPC ........................................................ 416/97
See application file for complete search history.

(56) References Cited

U.S. PATENT DOCUMENTS

| 5,197,852 | A  | 3/1993  | Walker et al.   |
|-----------|----|---------|-----------------|
| 5,246,340 | A  | 9/1993  | Winstanley et al. |
| 5,370,499 | A  | 12/1994 | Lee             |
| 5,700,132 | A  | 12/1997 | Lampes et al.   |
| 5,797,726 | A  | 8/1998  | Lee             |
| 6,974,308 | B2 | 12/2005 | Halfmann et al. |
| 7,008,179 | B2 | 3/2006  | Rinck et al.    |
| 7,347,671 | B2 | 3/2008  | Dorling et al.  |
| 8,506,252 | B1 | 8/2013  | Liang           |
| 8,668,453 | B2 | 3/2014  | Lee et al.      |

(Continued)

FOREIGN PATENT DOCUMENTS

| EP | 0457712 A1  | 11/1991 |
| EP | 1111190 A1  | 6/2001  |
| JP | H07019003 A | 1/1995  |

OTHER PUBLICATIONS

Extended European Search Report and Opinion issued in connection with corresponding EP Application No. 18186027.1 dated Dec. 17, 2018.

*Primary Examiner* — Joseph J Dallo
*Assistant Examiner* — Scott A Reinbold
(74) *Attorney, Agent, or Firm* — McGarry Bair PC

(57) ABSTRACT

An apparatus and method for cooling an engine component such as an airfoil can include an outer wall separating a cooling fluid flow from a hot flow. A cooling circuit can be provided in the engine component including a cooling passage having at least one pin within the cooling passage with a chevron shape and a non-uniform configuration.

26 Claims, 9 Drawing Sheets

(56) References Cited

U.S. PATENT DOCUMENTS

| | | |
|---|---|---|
| 8,690,538 B2 | 4/2014 | Levine et al. |
| 9,157,329 B2 | 10/2015 | Nadeau et al. |
| 2007/0297916 A1 | 12/2007 | Levine et al. |
| 2012/0201653 A1 | 8/2012 | Moga et al. |
| 2015/0377029 A1* | 12/2015 | Blake ..................... F01D 5/187 |
| | | 416/232 |
| 2016/0059437 A1 | 3/2016 | Lacy et al. |
| 2017/0096900 A1* | 4/2017 | Bunker ................... F01D 5/141 |

* cited by examiner

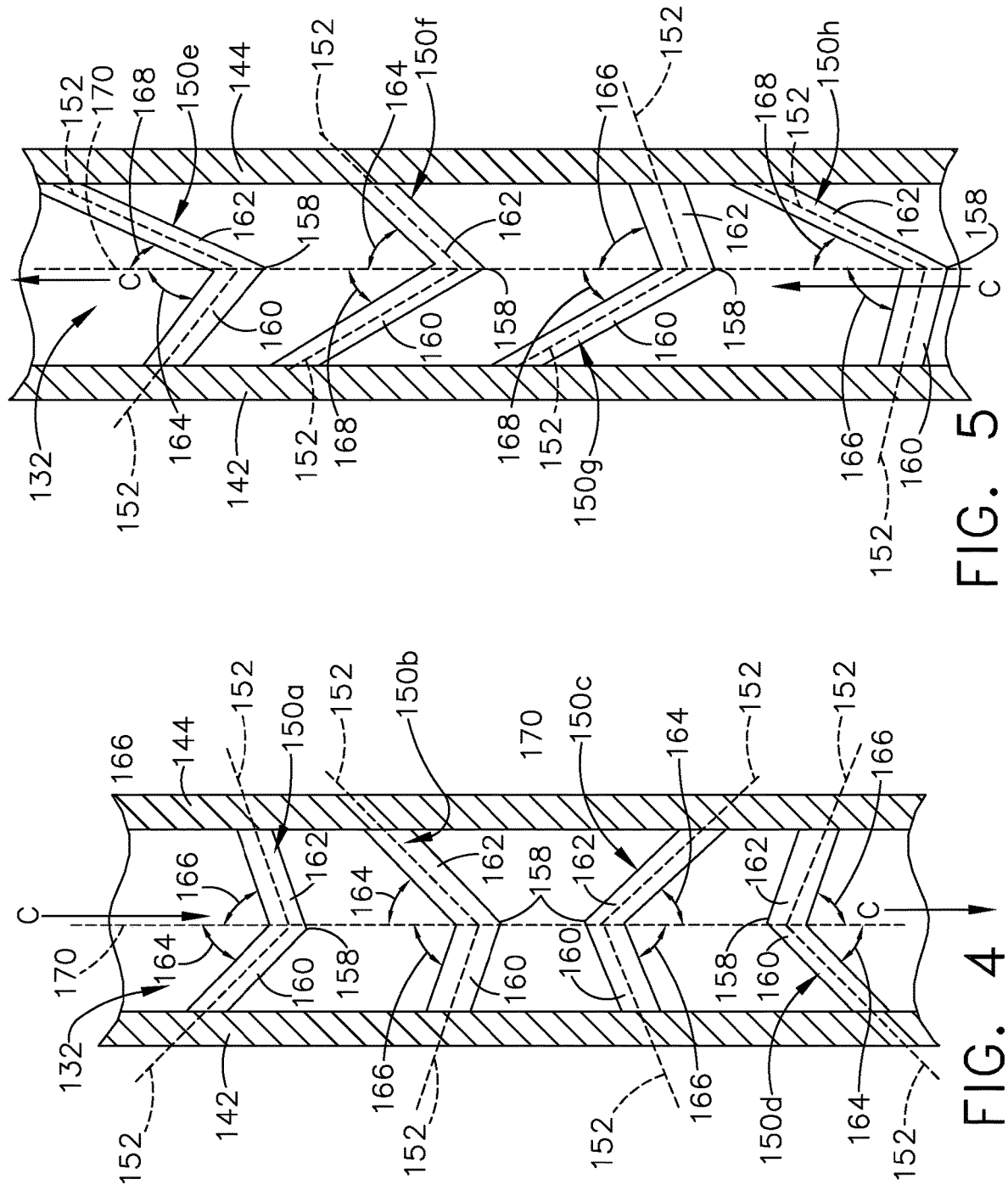

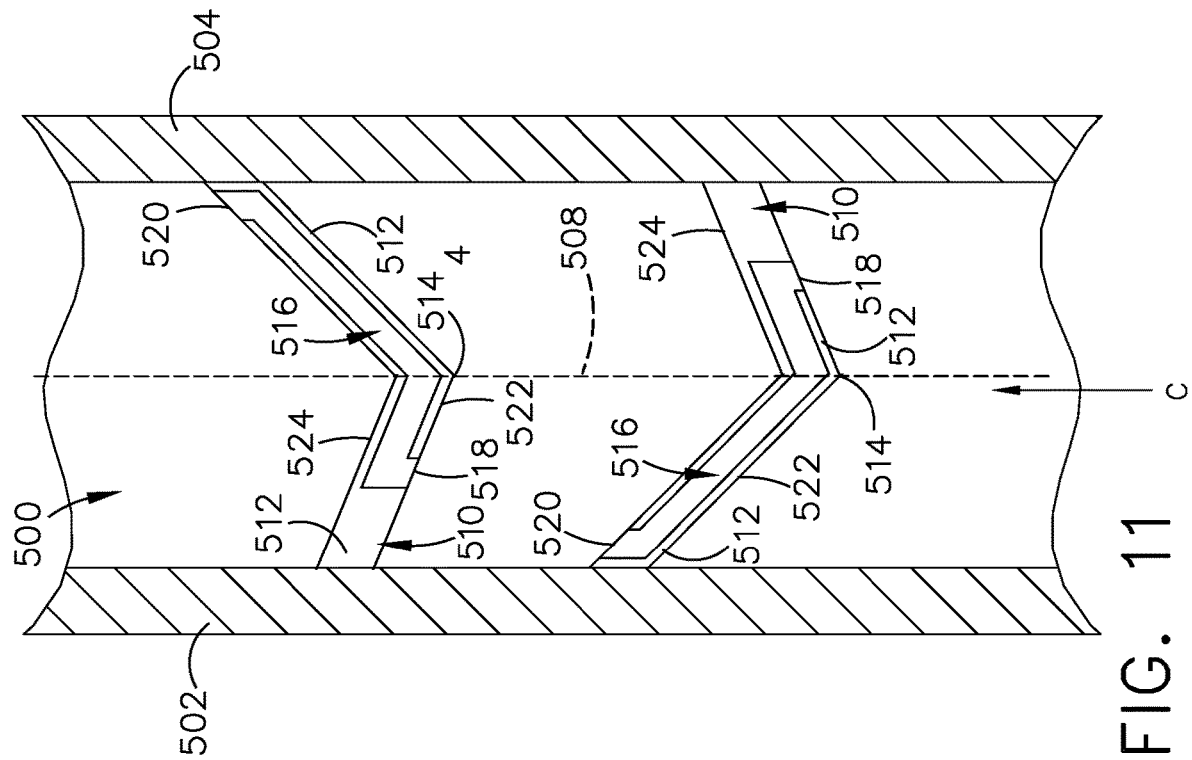
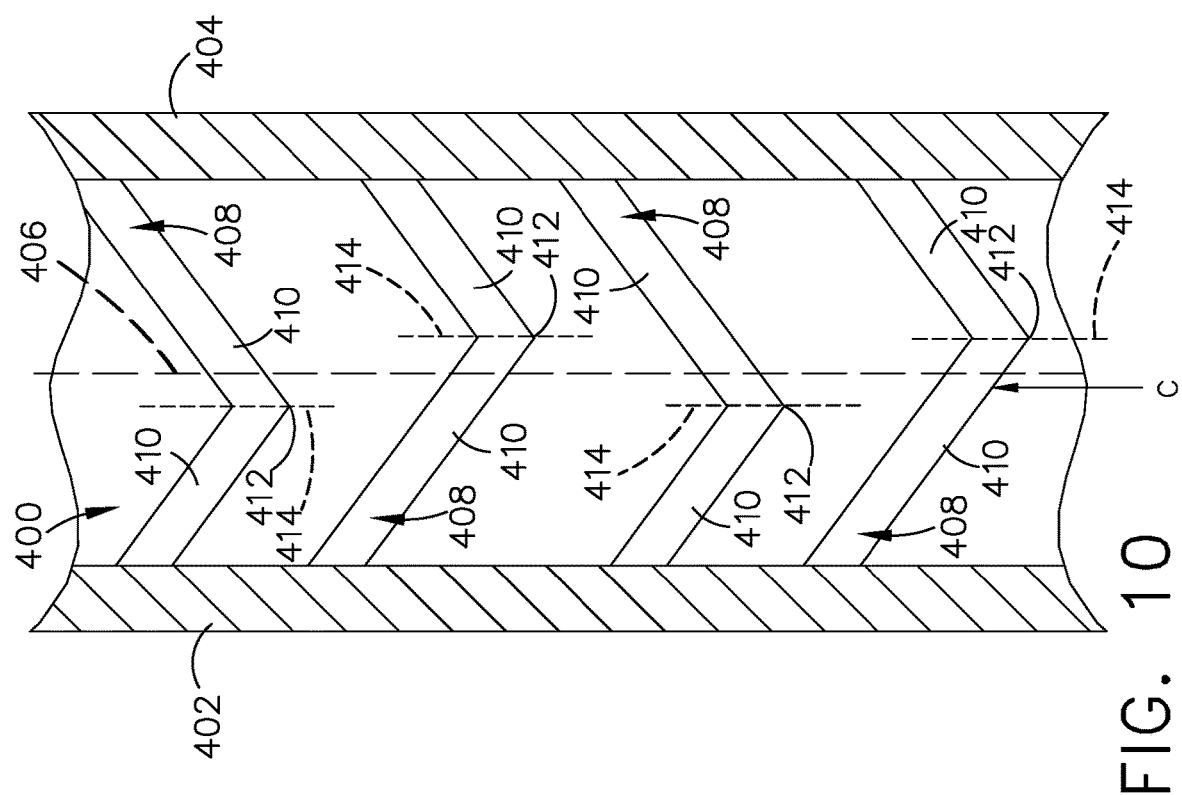

ENGINE COMPONENT WITH NON-UNIFORM CHEVRON PINS

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the present disclosure relates to an airfoil for a turbine engine including an outer wall defining a pressure side and a suction side extending axially between a leading edge and a trailing edge defining a chord-wise direction and extending radially between a root and a tip defining a span-wise direction. A cooling circuit is located within the airfoil and includes a passage wall defining a cooling passage. At least one pin spans the cooling passage and has a chevron-shaped body with two legs joined at a junction defining a body centerline. The chevron-shaped body is asymmetrical relative to the body centerline.

In another aspect, the present disclosure relates to a component for a turbine engine including an outer wall separating a cooling airflow from a hot airflow having a first surface facing the cooling airflow and a second surface facing the hot airflow. A cooling circuit is located within the component and includes a passage wall defining a cooling passage. At least one pin spans the cooling passage and has a chevron-shaped body with two legs joined at a junction defining a body centerline. The chevron-shaped body is asymmetrical relative to the body centerline.

In yet another aspect, the present disclosure relates to a method of cooling an engine component including generating an asymmetrical turbulent flow by flowing a cooling fluid over at least one pin having a chevron-shaped body with two legs joined at a junction defining a body centerline. The chevron-shaped body is asymmetrical relative to the body centerline.

BRIEF DESCRIPTION OF THE DRAWINGS

In the drawings:

FIG. 4 is an exemplary cross-sectional view taken across section 4-4 of FIG. 3 illustrating non-uniform pins in the pin bank having different angles for legs of the chevron pins.

FIG. 5 is another exemplary cross-sectional view of the pins of FIG. 3 illustrating additional non-uniform pins having additional angles for the legs of the pins.

FIG. 10 is another exemplary cross-sectional view illustrating pins having pin centerlines offset from a passage centerline.

FIG. 11 is another exemplary cross-sectional view illustrating pins having interior passages defining an asymmetry for the pins.

DETAILED DESCRIPTION OF THE INVENTION

Figure 1:
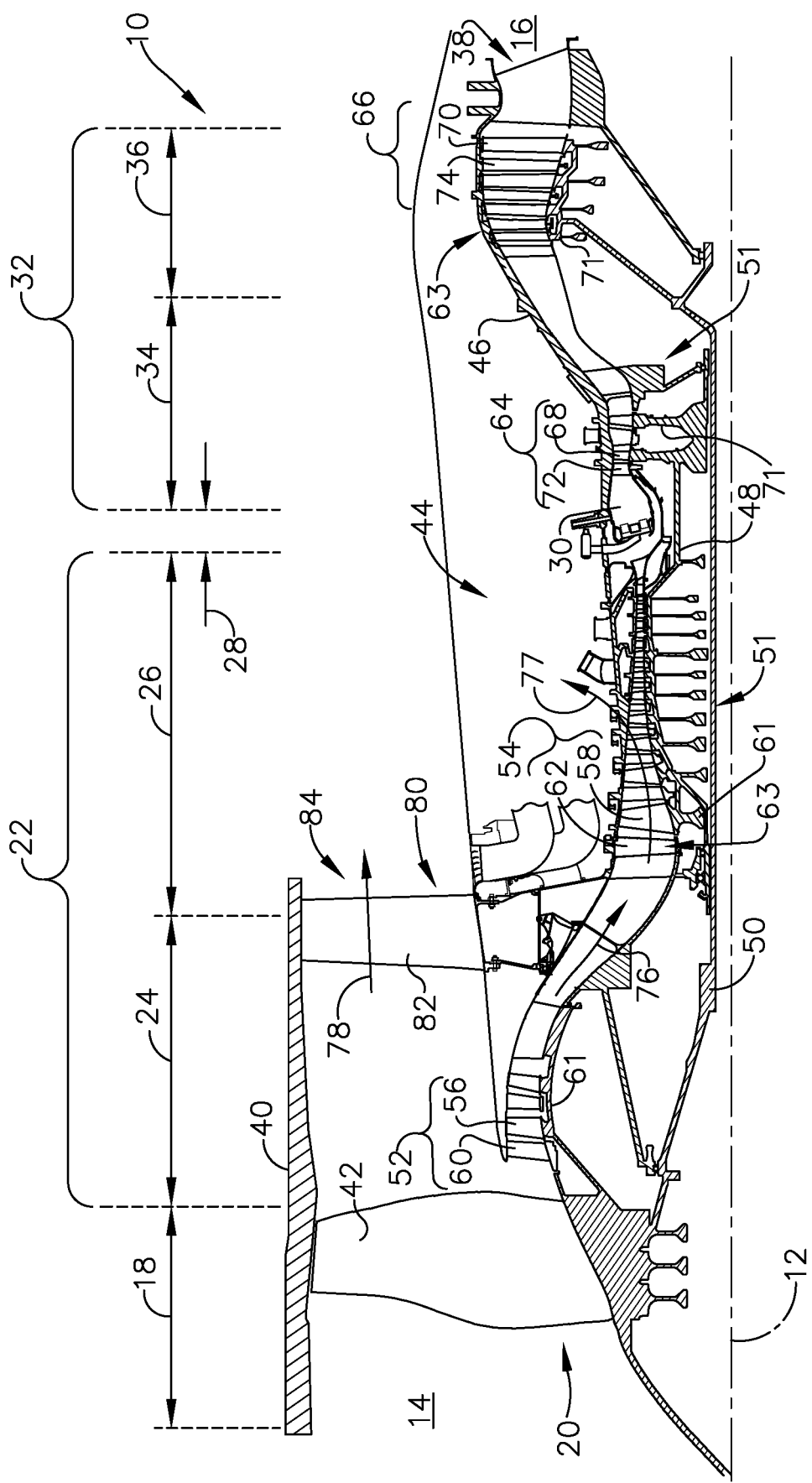
FIG. 1 is a schematic cross-sectional diagram of a gas turbine engine for an aircraft.

Aspects of the disclosure described herein are directed to a conduit provided through a pin or pins in a pin bank. For purposes of illustration, the present disclosure will be described with respect to a blade airfoil for a gas turbine engine for an aircraft. It will be understood, however, that aspects of the disclosure described herein are not so limited and may have general applicability within other components of such an engine, including but not limited to vanes, nozzles, struts, or shrouds, and can include any suitable type of turbine engine, as well as non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
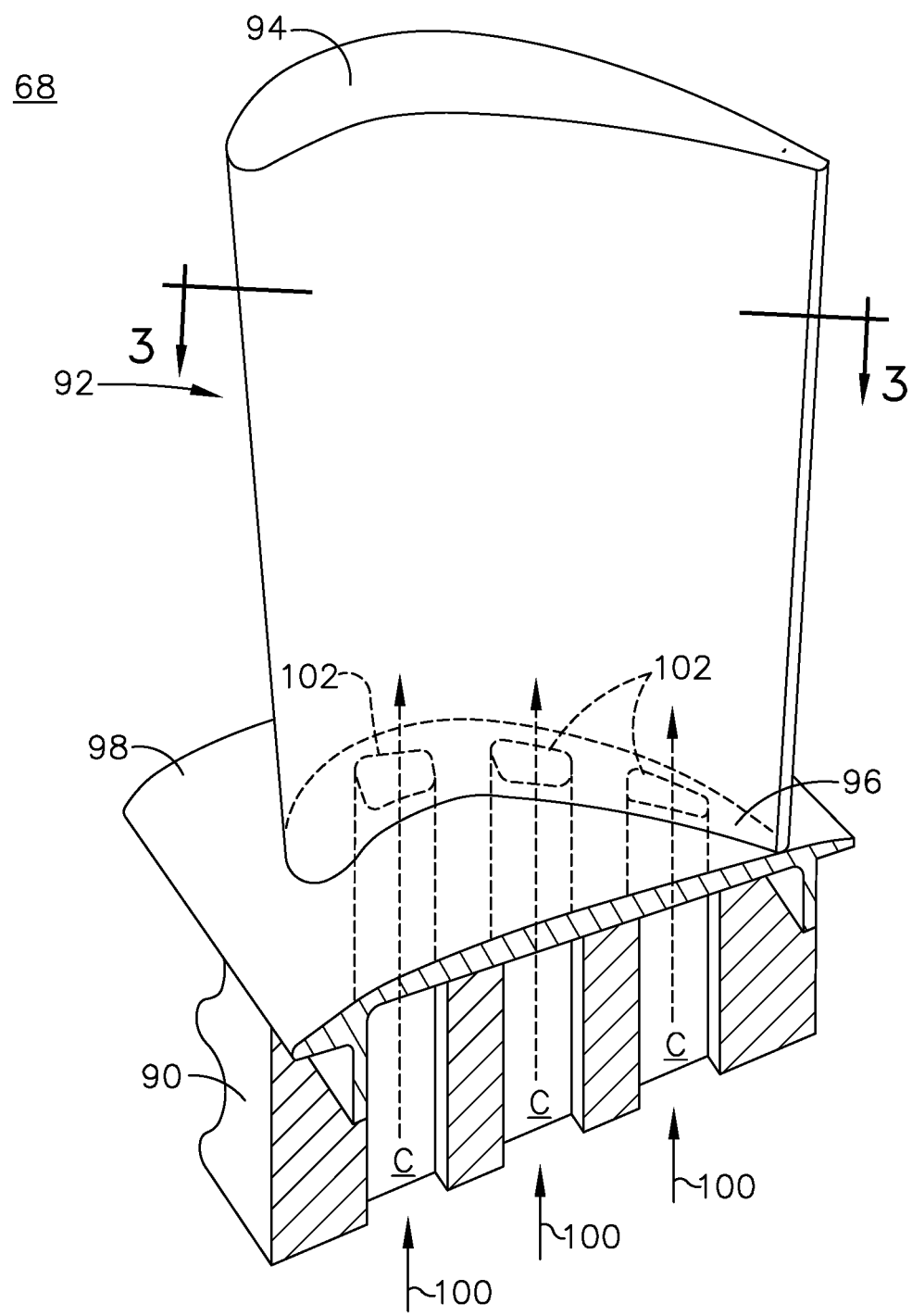
FIG. 2 is a perspective view of a blade provided in the gas turbine engine of FIG. 1.

FIG. 2 is a perspective view of an engine component in the form of one of the turbine blades 68 of the engine 10 from FIG. 1. The turbine blade 68 includes a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain the turbine engine mainstream airflow. The dovetail 90 can be configured to mount to a turbine rotor disk 71 on the engine 10 (FIG. 1). The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. A flow of cooling fluid C can be provided to the airfoil 92 through the inlet passages 100. The flow of cooling fluid C can be used to cool portions of the airfoil 92 operating under heightened temperatures.

Figure 3:
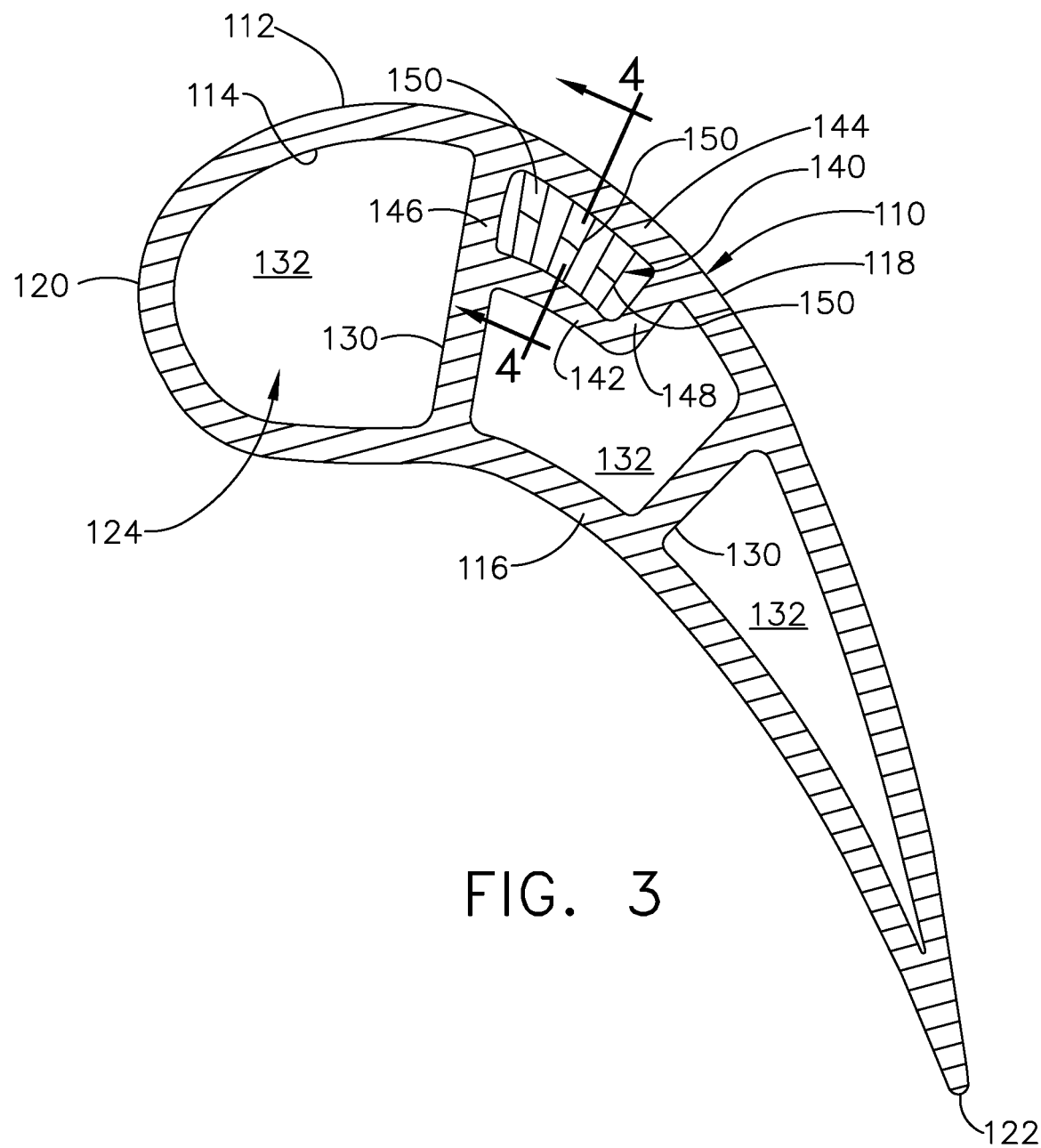
FIG. 3 is a cross-sectional view of the blade of FIG. 2 taken across-section 3-3 and illustrating a pin bank provided in the blade.

Turning to FIG. 3, the airfoil 92 includes an outer wall 110 having a first surface 112 and a second surface 114. The first surface 112 can be an exterior surface of the airfoil 92 confronting a hot airflow and the second surface 114 can be an interior surface of the airfoil 92 confronting a cooling airflow, such as the flow of cooling fluid C of FIG. 2. The outer wall 110 further defines a concave-shaped pressure sidewall 116 and a convex-shaped suction sidewall 118 which are joined together to define an airfoil shape with a leading edge 120 and a trailing edge 122, defining a chord-wise direction therebetween. The airfoil 92 has an interior 124 enclosed by the outer wall 110. In operation, the blade 68 rotates in a direction such that the pressure sidewall 116 follows the suction sidewall 118. Thus, as shown in FIG. 3, the airfoil 92 would rotate upward toward the top of the page and somewhat into the page.

One or more ribs 130 can divide the interior 124 into multiple cooling passages 132. The cooling passages 132 can extend at least partially through the airfoil 92 in a substantially span-wise direction. It should be understood that the cooling passage 132 and the particular interior 124 of the airfoil 92 is exemplary and for purposes of understanding only. The cooling passages 132 can include additional elements, such as passages, channels, circuits, pin banks, sub-circuits, plenums, near-wall cooling circuits, or similar. The cooling passages 132 and any such additional elements can form a cooling circuit 134 within the interior 124 of the airfoil 92.

The interior 124 can further include a first pin bank 140. The pin bank 140 can be provided along the suction sidewall 118 of the outer wall 110, while any position is contemplated. The pin bank 140 can include a passage wall arranged as a first sidewall 142 and a second sidewall 144, with the second sidewall 144 formed as a portion of the outer wall 110. It should be appreciated that the outer wall 110 need not form a portion of the pin bank 140 or either of the sidewalls 142, 144 of the pin bank 140. In such an example, the pin bank 140 can be formed by sidewalls 142, 144 housed entirely within the interior 124 of the airfoil 92. The first and second sidewalls 142, 144 can connect by a first endwall 146 and a second endwall 148 to define the pin bank 140 as a cooling passage 132 extending in the span-wise direction through the airfoil 92. As shown, the first endwall 146 is formed as part of one rib 130, while it is further contemplated that the first endwall 146 can be formed independent of any other interior or exterior structure or wall. One or more pins, such as chevron pins 150 extend between the first and second sidewalls 142, 144. A pin 150, which can be a chevron-shaped pin, for example, can generally define an asymmetry, which includes two angularly opposite legs adjoined at a junction. The pin bank 140 can at least partially form the cooling passage 132 between the sidewalls 142, 144 and the end walls 146, 148, or can be formed as part of the cooling passage 132 defined by the ribs 130. Regardless, it should be appreciated that the pin bank 140 is provided in a cooling passage 132 formed as a portion of the cooling circuit 134 through the airfoil 92.

It should be understood that the locations, number, and orientations of the cooling passages 132, the pin bank 140, and the chevron pins 150 should not be limited as shown. The airfoil 92 of FIG. 3 is by way of example only to facilitate understanding of the aspects described herein. The number, organization, geometry, position, or otherwise of the cooling passages 132, cooling circuit 134, pin bank 140, or chevron pins 150 can vary in any manner such that a flow of cooling fluid can be provided through the cooling passage 132 of the cooling circuit 134 extending through the airfoil 92, with the pin bank 140 provided in the cooling passage 132 with at least one chevron pin 150 provided in the pin bank 140.

Additionally, it should be appreciated that the aspects of the airfoil 92 can have equal applicability to any engine component utilizing pin bank cooling. Non-limiting examples of such components can include a vane, nozzle, shroud, or combustion liner. The outer wall 110 can be a wall of such an engine component for separating a hot airflow from a cooling airflow at the first and second surfaces 112, 114 respectively, for example. A cooling passage having opposing sidewalls can extend through such an engine component defining at least a portion of a cooling circuit for providing the cooling airflow through the component, and including a set of pins to form a pin bank in the cooling passage. At least one chevron pin can be included in the set of pins of the pin bank provided in the cooling passage of the engine component.

FIG. 4 illustrates four asymmetric pins 150a-d, which can be the pins 150 of FIG. 3. Asymmetric, as used herein, means that the pin is non-symmetric about a pin centerline 170 or a junction 158 between two legs 160, 162 of the chevron-shaped pin 150a-d have a differing geometric organization, angle, shape, length, volume, size, cross section, cross-sectional area, or orientation. The term asymetric and non-uniform can be used interchangeably, herein. The pin centerline 170 can be defined between the opposing sidewalls 142, 144, as the center of the cooling passage 132, or at the junction 158 between the legs 160, 162, for example. Each leg 160, 162 can define a leg axis 152 as an axis extending through the center of the leg 160, 162. While the pin centerline 170 is shown as constant throughout the cooling passage 132, it should be understood that the pin centerline 170 is particular to each pin 150a-d, and can vary along the cooling passage 132. While the legs 160, 162 may be shown herein as having equal lengths or being positioned equally between the opposing sidewalls 142, 144, the legs 160, 162 can be different lengths, or be offset from one of the opposing sidewalls 142, 144 and should not be limited as shown. Such geometry can define the asymmetry for the pins 150a-d. Specific, non-limiting examples of the asymmetric organization for the pins 150a-d can include legs 160, 162 having different lengths, different heights, different volumes, or different cross-sectional shapes or areas, many of which are further described herein. One further, non-limiting example of the asymmetric organization can include a location for the junction 158 that is offset from an axis through the pin at the junction 158 between the legs 160, 162, or the center of the pin 150a-d, taken relative to the sidewalls 142, 144 or relative to total volume of the pin. Another further, non-limiting example of the asymmetric organization can include varying angles for the legs, taken relative to a centerline of the passage, the walls of the sidewalls, or to a centerline defined through the pin or along the cooling passage.

Continuing with FIG. 4, a first pin 150a includes legs 160, 162 with the first leg 160 extending from the first sidewall 142 provided at a standard angle 164 and second leg 162 extending from the second sidewall 144 at a high angle 166. The standard angle 164 and high angle 166 can be defined relative to a pin centerline 170 defined as a centerline axis defined along a junction 158 between the first and second legs 160, 162. Alternatively, the pin centerline 170 can be defined as the centerline through the cooling passage 132, in one non-limiting example. The pin centerline 170 can further be defined as an axis extending parallel to the sidewalls 142, 144 local to the pin 150a-d. In yet another example, the pin centerline 170 can be orthogonal the engine centerline 12 of FIG. 1, as a radius of the engine, or can be orthogonal to a span-wise axis defined between the leading edge 120 and the trailing edge 122 of the airfoil 92 of FIG. 3. In yet another example, the pin centerline 170 can be defined to be parallel to the local streamline flow of the flow of cooling fluid C passing through the cooling passage 132. It should be appreciated, however, the angles 164, 166, 168 can be determined by any suitable method, such as relative to the leg axes 152, and are not limited to the examples shown or described herein.

The first pin 150a can be oriented such that the junction 158 faces away from the flow direction of the flow of cooling fluid C passing through the cooling passage 132. The standard angle 164 can be an angle between 30-degrees and 60-degrees, for example and the high angle 166 can be an angle between 60-degrees and 90-degrees, for example, relative to the pin centerline 170. Alternatively, the high angle 166 can be defined as an angle that is greater than the standard angle 164 or a low angle 168 (see FIG. 5) for a remaining leg 160, 162 of the pin 150.

A second pin 150b can be mirrored about the junction 158 of the first pin 150a, having the first leg 160 extending from the first sidewall at the high angle 166 and having the second leg 162 extending from the second sidewall 144 at the standard angle 164. The first and second pins 150a, 150b can be oriented such that the junction 158 points away from the direction of the flow of cooling fluid C passing through the cooling passage 132.

A third pin 150c and a fourth pin 150d can be similar to the second pin 150b and the first pin 150a, respectively, except that the third and fourth pins 150c, 150d have junctions 158 that confront the flow of cooling fluid C. Each of the third and fourth pins 150c, 150d have one leg 160, 162 oriented at the high angle 166, and the other leg 160, 162 oriented at the standard angle 164.

Referring now to FIG. 5, the pins 150 can alternatively have one leg 160, 162 oriented at the low angle 168. A low angle 168 as described herein can be an angle that is between 1-degree and 30-degrees relative to the pin centerline 170. Alternatively, a low angle 168 can be defined as an angle that is lesser than the standard angle 164, or the high angle 166. A fifth pin 150e includes the first leg 160 oriented at the standard angle 164 and the second leg 162 oriented at the low angle 168. A sixth pin 150f can be similar to the fifth pin 150e, mirrored about the junction 158 such that the first leg 160 adjacent the first sidewall 142 is positioned at the low angle 168 and the second leg 162 adjacent the second sidewall 144 is positioned at the standard angle 164. A seventh pin 150g and an eight pin 150h can include one leg 160, 162 oriented at the low angle 168, and one leg oriented at the high angle 166.

It should be understood in FIGS. 4 and 5 that any of the pins 150a-h as shown can be used as the pins 150 of FIG. 3, such that the pins 150 have an asymmetric orientation. The leg axes 152 can be arranged such that the leg angles defined between the legs 160, 162 and the pin centerline 170 are unequal. Furthermore, it should be understood that the asymmetry need not be limited to the difference between a standard angle 164, high angle 166, or low angle 168, but that the asymmetry among the legs can be as small as 1-degree. For example, a first leg could be oriented at a thirty-four degree angle relative to a sidewall and a second leg could be oriented at a thirty-five degree angle relative to an opposing sidewall.

Figure 6:
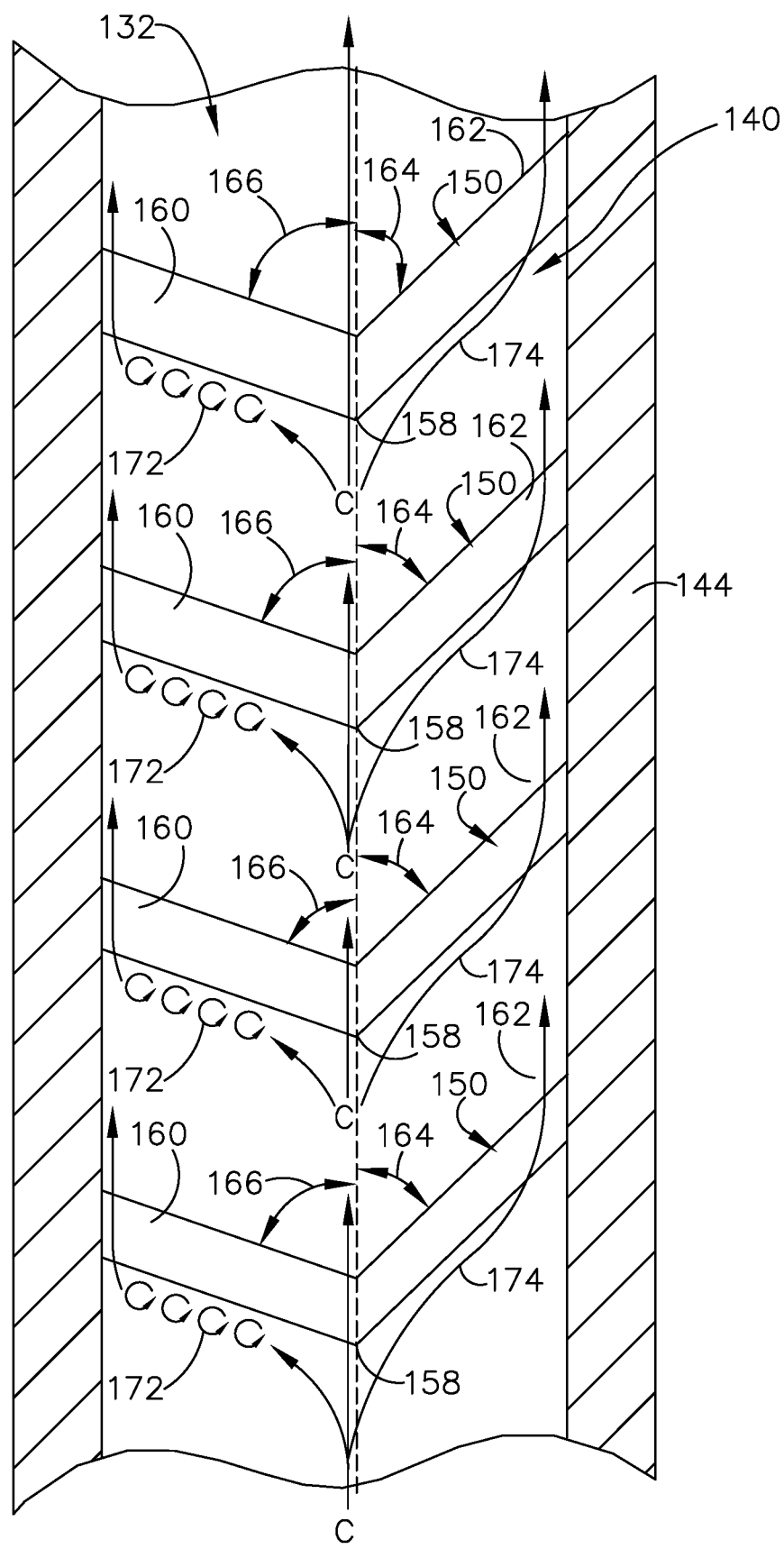
FIG. 6 is another exemplary cross-sectional view illustrating a flow of cooling fluid passing along the pin bank of non-uniform pins.

Referring now to FIG. 6, the flow of cooling fluid C can be passed through the cooling passage 132 along the pins 150b. FIG. 6 is shown with a set of pins 150b, having the high angle 166 for the first leg 160 and the standard angle 164 for the second leg 162. It should be appreciated that FIG. 6 is exemplary as shown, and that the cooling passage 132 can include any of the pins 150a-h in any organization. The asymmetric structure of the pins 150b can be used to influence the flow of cooling fluid C as well as cool the surrounding structure and engine component. The high angle 166 orients the first leg 160 at a greater angle relative to the flow of cooling fluid C, while the standard angle 164 is steeper. In the example as shown, the high angle 166 can provide for greater local turbulation 172 against the first sidewall 142, which can provide for improved local cooling, while the steeper angle of the standard angle 164 can provide for greater local velocities at 174 near the second sidewall 144, as compared to the turbulated flow 172 of the high angle 166. Similarly, the low angle 168 could provide for higher local velocities than the standard angle 164, while the standard angle 164 can provide for increased turbulation. However, it should be appreciated that the high angle 166 can provide for greater local velocities, the standard angle 164 could provide for greater turbulation, and that the particular angles or orientations of the pins 150 should not limit the particular types of effects caused in the flow of cooling fluid C. It should be understood that while the flow at 174 is not shown as including turbulence, the pins can generate increased turbulence, while it will be lesser than that of the first leg 160 at 172.

As such, it should be appreciated that the non-uniform pins 150a-h as described herein can be used to locally tailor the cooling along the cooling passage 132 as may be desirable. The particular pins 150a-h can also be tailored based upon the amount of cooling fluid flow, overall weight, manufacturability, pressure drop, and physical constraints of the engine component such as size and shape of the local cooling passages. Furthermore, component lifetime is improved and required maintenance is reduced.

The non-uniform pins 150a-h can provide for specific tuning of the pins in the pin bank, which can provide for locally improving mechanical stresses of the engine component as well as tailoring where generated vortices of the flow of cooling fluid C are directed. As such, the local heat transfer coefficients can be tailored to the particular needs of the engine component, which can provide for improving overall heat transfer effectiveness and improvements for thermal stresses.

Figure 7:
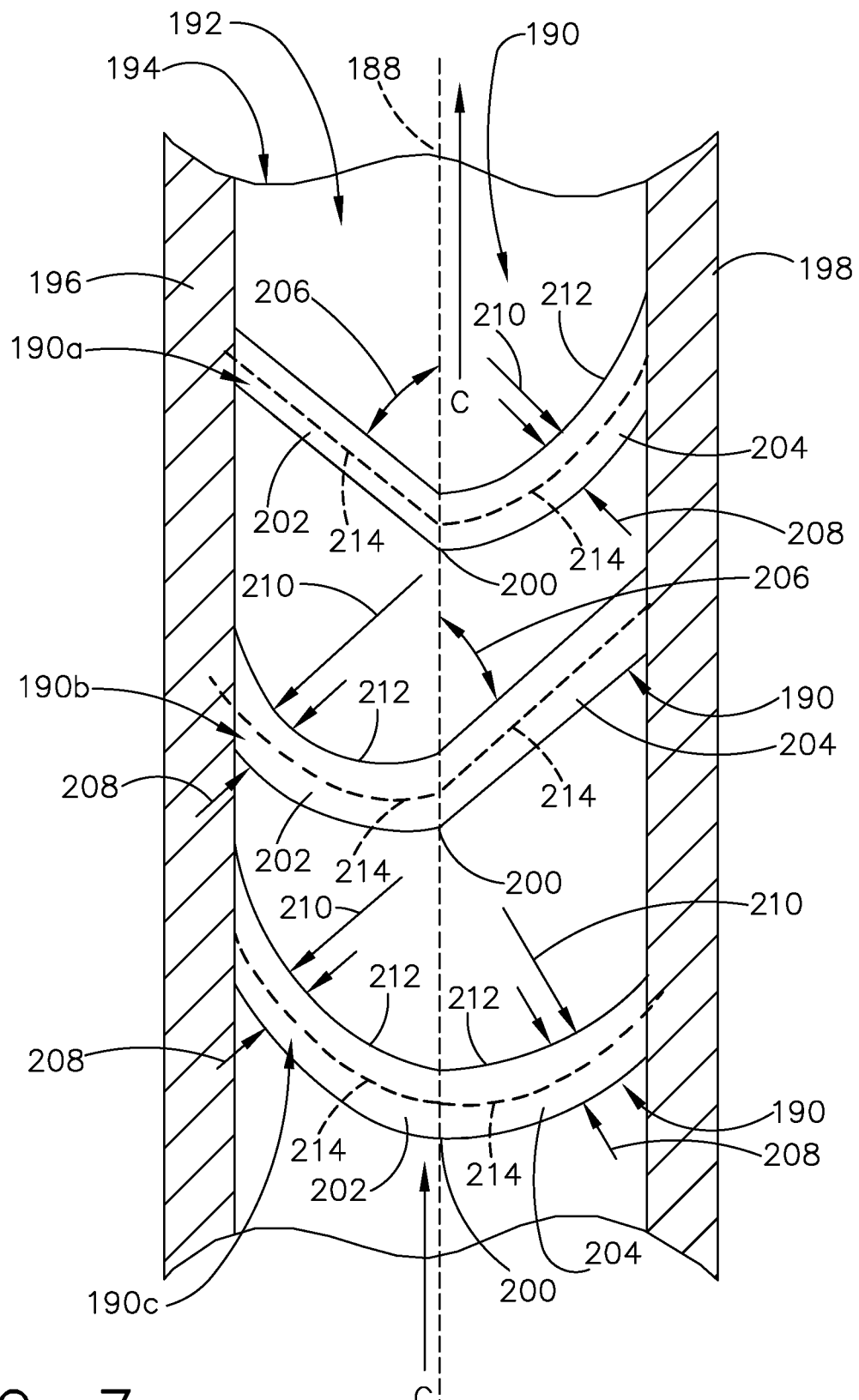
FIG. 7 is an exemplary cross-sectional view of non-uniform pins having curved legs.

Referring now to FIG. 7, another set of exemplary asymmetric pins 190 are shown provided within a cooling passage 192 at least partially defining a cooling circuit 194 between a first sidewall 196 and a second sidewall 198. A flow of cooling fluid C can pass through the cooling passage 192 along the pins 190. The pins 190 can be organized as a set of pins 190, which can form a pin bank in one example.

The pins 190 can include a junction 200 separating the pins 190 into a first leg 202 extending from the first sidewall 196 and a second leg 204 extending from the second sidewall 198. The junction 200 can define a pin centerline 188 through each pin 190. A leg axis 214 can be defined extending centrally along each leg of the pin 190. The leg axes 214 can be offset such that they are not parallel, and can define an acute angle between them. A first pin 190a includes the first leg 202 oriented at a standard angle 206, which can be between 30-degrees and 60-degrees, in one non-limiting example, while any angle between 1-degree and 89-degrees is contemplated. The second leg 204 can include a thickness 208 as the greatest cross-sectional distance through the second leg 204. The thickness 208 can be equal to the thickness of the sidewalls 196, 198, in one non-limiting example, while any thickness 208 is contemplated. The second leg 204 is curved having a radius of curvature 210, defining a curved leg axis 214 for the second leg 204. The radius of curvature 210 can be determined relative an inner edge 212, which can be the inner wall adjacent concave side of the curved leg, having the smallest distance defined by the curvature. The radius of curvature 210 can be between one-half the thickness 208 of the second leg 204 and four times the thickness 208 of the second leg 204, measured relative to the inner edge 212, or can alternatively be twice the thickness 208 in one non-limiting example. The first pin 190 is asymmetric in having one linear leg as the first leg 202 and one curved or arcuate leg as the second leg 204.

A second pin 190b can have the first leg 202 as the curved leg defining a curved leg axis 214, and can include a decreased radius of curvature 210 as compared to the first pin 190a, such as equal to the thickness 208 of the first leg 202, while the radius of curvature 210 for the second pin 190b can be between one-half and four times the thickness 208, relative to the inner edge 212, similar to that of the first pin 190a. Additionally, the curvature of one or more legs should be oriented in order to prevent a leg from partially extending beyond the tip of the junction of the pin. Furthermore, a radius of curvature that is too small can cause a leg to extend beyond the wall and meet at a second junction spaced from the junction. As such, the radius of curvature should be maintained above such a threshold.

A third pin 190c can include the first leg 202 as a curved leg and the second leg 204 as a curved leg, with each leg 202, 204 having a different radius of curvature 210 and including a curved leg axis 214. For example, the first leg 202 can have a tighter curvature, having a radius of curvature 210 that is twice the thickness 208 of the first leg 202 relative to the inner edge 212, while the second leg 204 can have a wider curvature, having a radius of curvature 210 that is four times the thickness 208 of the second leg 204 relative to the inner edge 212. In an alternative example, the first and second leg of the third pin 190c can have the same radius curvature 210 as defined relative to the thickness of the respective legs 202, 204, resultant of having a different thicknesses 208 for each leg 202, 204. In such a case, the asymmetry for the third pin 190c can be resultant of the different thicknesses 208 among the legs 202, 204.

Figure 8:
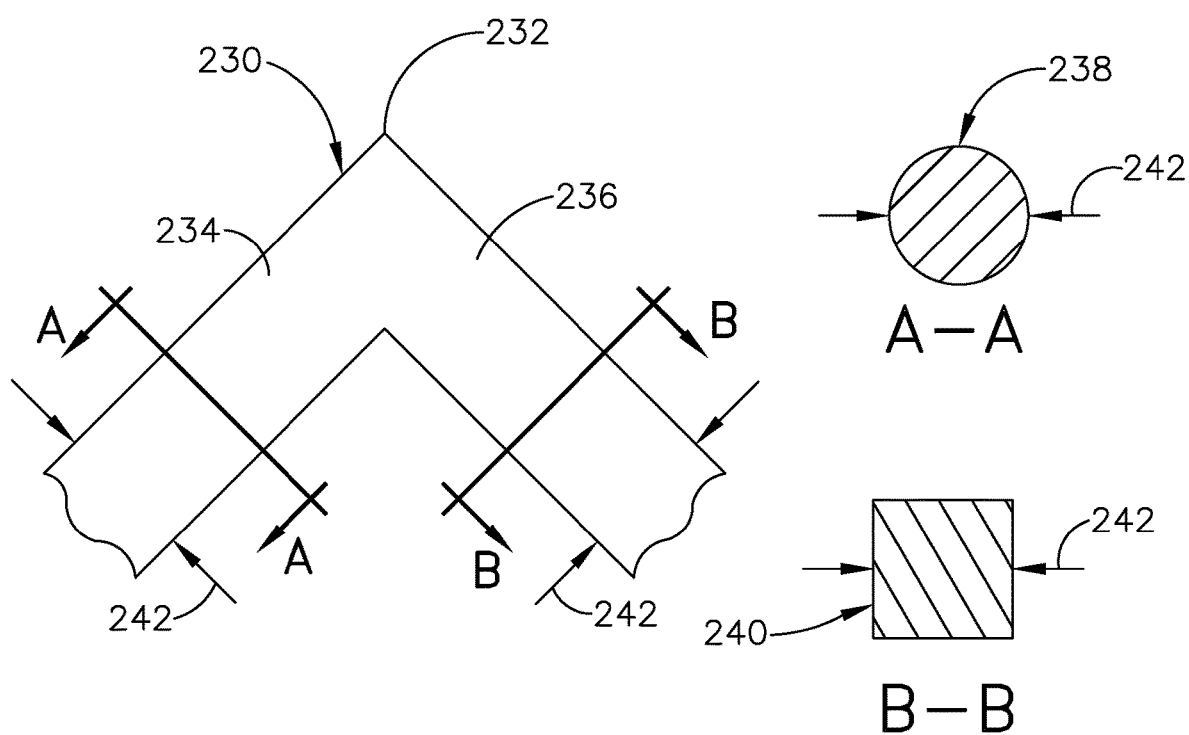
FIG. 8 is another exemplary non-uniform pin having non-uniform cross-sectional shapes and areas.

Referring now to FIG. 8, a portion of another exemplary asymmetric pin 230 is shown, having a junction 232 separating a first leg 234 and a second leg 236. The pin 230 can be asymmetric, having different cross-sectional shapes. A first cross-sectional shape 238 can be circular for the first leg 234, shown as section A-A. A second cross-sectional shape 240 can be square for the second leg 236, shown as section B-B. The junction 232 can act as a transition between the first and second legs 234, 236, providing for a gradual transition between the shapes in order to prevent flow separation resultant of joining legs having two different cross-sectional shapes. While shown as a circular and a square cross-sectional shape, any shape is contemplated, such as square, rectangular, rectilinear, circular, oval, rounded, unique, or variable in non-limiting examples.

Additionally, the pin 230 can be asymmetric, having different cross-sectional areas. A thickness 242 for the pin 230 can be the same for the first and second legs 234, 236. However, a thickness 242 for the square profile taken at section B-B can define a cross-sectional area that is larger than a circular profile taken at section C-C where the thickness 242 is the diameter of a circle. Furthermore, the thicknesses 242 for the first and second legs 234, 236 need not be the same, and can be different, defining different cross-sectional areas for each leg 234, 236. Further still, the cross-sectional areas and shapes for each leg 234, 236 can be variable or changing discretely along each leg 234, 236. Such variability can be unique to each leg, such that an asymmetric pin is defined or a varying profile along a portion of the pin or legs.

Figure 9:
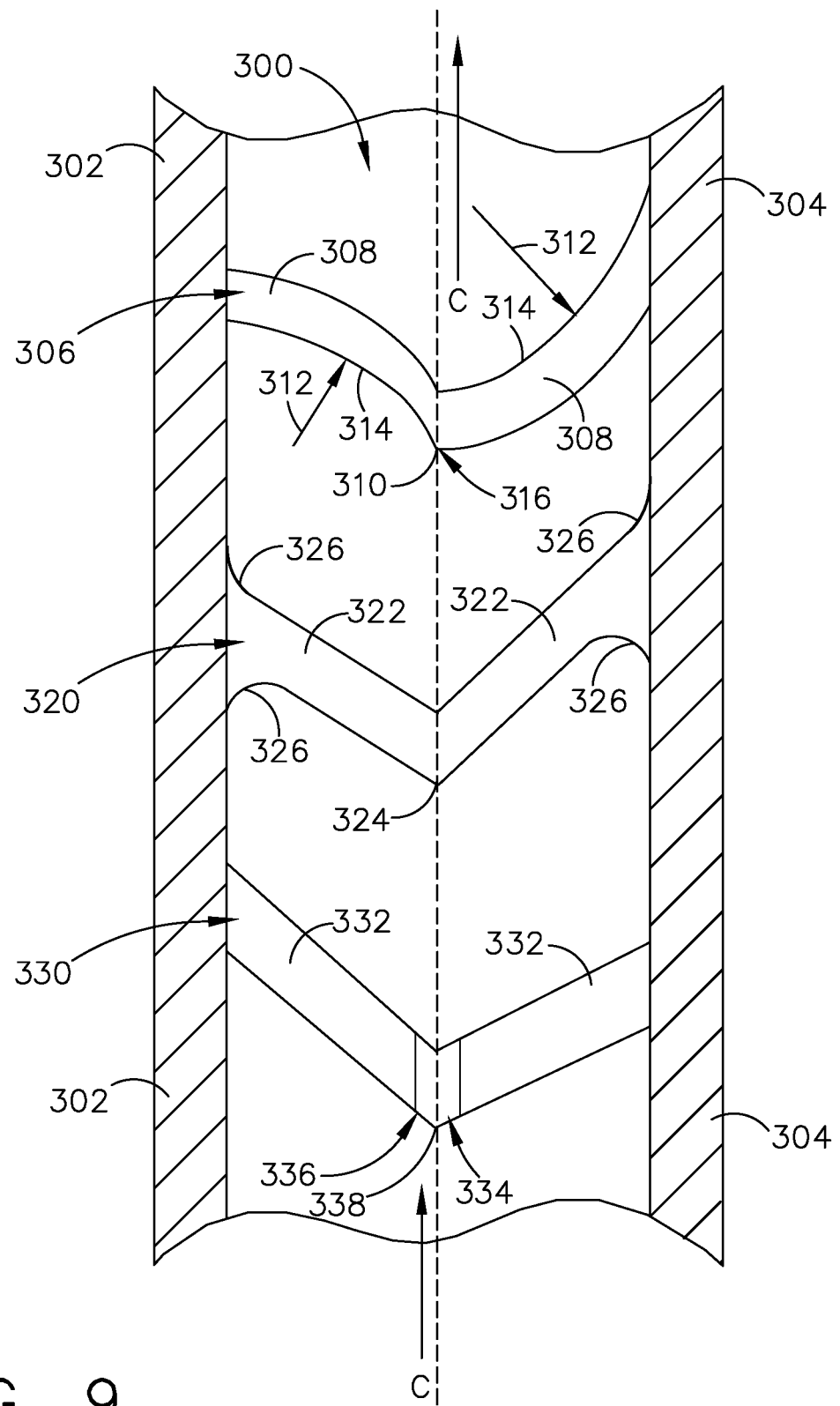
FIG. 9 is another exemplary cross-sectional view illustrating variations on the non-uniform pins.

Referring now to FIG. 9, another exemplary set of asymmetric pins are provided in a cooling passage 300 that can form a portion of a cooling circuit between a first sidewall 302 and a second sidewall 304. While shown together, it should be appreciated that each of the pins can be utilized separate from one another, such as in a pin bank having a group of the same type of pins. Additionally, the pins as described can include any asymmetric geometry as described herein, and should not be limited as shown.

A first asymmetric pin 306 can include two legs 308 adjoined at a junction 310. The legs 308 can be curved or arcuate, defining a radius of curvature 312 for each leg 308, which can be the same between each leg 308 or different. In one non-limiting example, the radius of curvature for each leg 308 can be between 0.5 and 4 the width of the leg 308, defined from an interior surface 314 of each leg 308.

The arcuate orientation of each leg can be different, such that the junction 310 defines an inflection point 316. As such, the interior surface 314 of the leg 308 adjacent the second sidewall 304 can face toward a flow of cooling fluid C through the cooling passage 300 and the interior surface 314 of the leg 308 adjacent the first sidewall 302 can face away from the flow of cooling fluid C. The junction 310 can be formed as a point, as shown, or can alternatively be continuous between each leg 308, such that the first asymmetric pin 306 forms a bent "S" shape, as a combined "S" and a chevron shape.

A second asymmetric pin 320 can include two legs 322 adjoined at a junction 324. The legs 322 can couple to the opposing sidewalls 302, 304 at a blend junction 326. The blend junctions 326 can be arcuate or curved, to transition between the sidewalls 302, 304 and the legs 322. The blend junctions 326 can be machined or formed at attachment of the second asymmetric pins 320 to the sidewalls 302, 304. The size of the blend junction 326 can be minimized to minimize impact to the overall geometry of the second asymmetric pin 320. Additionally, minimizing overall mass of the blend junctions 326 can minimize overall component weight.

A third asymmetric pin 330 can include two legs 332 extending from the opposing sidewalls 302, 304. The third asymmetric pin 330 can include a gap 334 between the two legs 332, such that the legs 332 do not connect to one another. In alternative example, the gap 334 can be provided in one of the legs 332, such that a junction 338 is formed by one leg 332, spaced from the gap 334. In another alternative example, an aperture 336 can be formed at the junction 338 between the legs 332, shown in dashed line. The aperture 336 can extend through the third asymmetric pin 330 at the junction 338, surrounded by remaining portions of the legs 332.

It should be appreciated that the different aspects described in FIGS. 4-9 defining the asymmetric chevron pin can be combined in any suitable manner, such that an asymmetric pin is defined, and are not limited by the particular examples as shown.

Referring now to FIG. 10, an alternative cooling passage 400 is defined between a first sidewall 402 and a second sidewall 404. A passage centerline 406 can be defined along the cooling passage 400 equidistant from the first and second sidewalls 402, 404. One or more asymmetric pins 408, having a chevron shape, are provided in the cooling passage 400. The asymmetric pins 408 each can include a set of legs 410 joined together at a junction 412, defining a pin centerline 414 at the junction 412. It should be understood that the pin centerline 414 can be offset from the passages centerline 406, such that the asymmetry for the pin 408 can orient the pin 408 or a portion thereof away from the center of the cooling passage 400. While illustrated in a patterned manner, it should be understood that the pins 408 need not be arranged in a patterned manner, and can be arranged in any manner, having one or more pins offset from the passage centerline 406 as defined by the pin centerline 414.

Referring now to FIG. 11, an alternative cooling passage 500 is defined between a first sidewall 502 and a second sidewall 504. A passage centerline 508 is defined along the cooling passage 500 equidistant from the sidewalls 502, 504. One or more pins 510 can extend between the opposing sidewalls 502, 504. The pins 510 can have a pair of legs 512 meeting at a junction 514. While the junction 514 is arranged along the passage centerline 508, it should be appreciated that the junction 514 can be offset from the passage centerline 508.

One or more internal passages 516 can extend at least partially within the pins 510, having an inlet 518 and an outlet 520 defining a flow path through the pins 510. The internal passages 516 can define an asymmetry for the pins 510, with the internal passages 516 being asymmetric about the passage centerline 508 or the junction 514. Similarly, the position of the inlet 518 or the outlet 520 can define the asymmetry. As shown, the inlet 518 is provided on an upstream side 522 of the pin 510, while the outlet 520 is provided on a downstream side of the pin 510, relative to a flow of cooling fluid C along the cooling passage 500. Additionally, it is contemplated that the internal passages 516 can define the asymmetry in combination with other elements as described herein.

A method of cooling an engine component, such as the airfoil of FIG. 2, can include generating an asymmetrical turbulent flow by flowing a cooling fluid over at least one pin having an asymmetric body with two legs joined at a junction defining a pin centerline. The body is asymmetrical relative to the pin centerline. The asymmetric shape can be similar to the asymmetric pins as described herein, having an asymmetry among the legs defining the pin.

The asymmetry for the pin can include a different angle between the pin and the pin centerline. For example, the angle between the pin and one sidewall can be one of the low angle, the standard angle, or the high angle as described herein, while the angle between the pin and the other sidewall can be a different one of the low angle, the standard angle, or the high angle. Alternatively, it need not be so distinct, and the difference among the angle at either sidewall can be as small as one degree.

The method can further include that the non-uniformity for the pin is that at least a portion of the pin has a curvature, such as that described in reference to FIG. 7. For example, one leg may have a curvature, or both legs may have a curvature that are different from one another, such that the pin is non-uniform. Where both legs have a curvature, the non-uniformity can be defined as a difference among radiuses of curvature between the two legs.

The method can further include that the pin has a non-constant cross-sectional area, which can define the uniformity. The non-cross-sectional area can include that one leg has an increased thickness as compared to another leg. Similarly, the method can further include that the pin has a varying or variable profile, such that the profile is non-constant along the pin. For example, such as that of FIG. 8, one leg can include a first profile, such as a circular profile, while the other leg can include a different second profile, such as a squared profile.

It should be appreciated that the aspects as described herein provide for improved cooling within an engine component, such as the airfoil 92. The pins 150a-h, 190, 230 can have improved cooling effectiveness as the flow of cooling fluid C passing along the pins 150 reduces the temperature of the pins, and adjacent component structure, resulting in a greater temperature differential, or a greater heat transfer coefficient, between the pins and a flow passing across the pins, which provides for more heat extracted from the flow. The increased surface area contacting the flow of cooling fluid improves overall cooling of the component. Similarly, the pins, particularly when organized as the pin bank, can improve structural integrity for the engine component, in addition to improving cooling effectiveness. Furthermore, the aspects can provide for improved component lifetime while minimizing required maintenance.

The engine components, as well as the features of the pins as described herein, can be made, formed, or manufactured by additive manufacturing, such as 3D printing in non-limiting examples. The non-uniform details of the pins and the surrounding structure may be difficult or impossible to manufacture using traditional methods, or may require excessive costs, or result in poor product yields. However, using additive manufacturing provides for consistent manufacture of the complex geometry of the pins as described herein.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall defining a pressure side and a suction side extending axially between a leading edge and a trailing edge defining a chord-wise direction and extending radially between a root and a tip defining a span-wise direction;
a cooling circuit located within the airfoil and comprising a passage wall defining a cooling passage; and
at least one pin spanning the cooling passage and having two legs each defining a leg axis and joined at a junction defining a pin centerline, where the pin is asymmetrical relative to the pin centerline;
wherein the at least one pin includes an internal passage extending at least partially through the at least one pin.

2. The airfoil of claim 1 wherein the leg axes are not parallel.

3. The airfoil of claim 2 wherein the leg axes define an acute angle between them.

4. The airfoil of claim 2 wherein the each leg axis defines a leg angle relative to the pin centerline and the leg angles are unequal.

5. The airfoil of claim 1 wherein the two legs include different lengths to define the asymmetry for the at least one pin.

6. The airfoil of claim 1 wherein the asymmetry for the at least one pin includes at least one of the two legs defining a high angle relative to the pin centerline being greater than 60 degrees.

7. The airfoil of claim 1 wherein the asymmetry for the at least one pin includes at least one of the two legs defining a low angle relative to the pin centerline being less than 30 degrees.

8. The airfoil of claim 1 wherein one leg of the two legs is curved to define the asymmetry for the at least one pin.

9. The airfoil of claim 8 wherein the curved leg of the two legs defines a radius of curvature relative to an inner edge of the curved leg is between 0.5 and 4.0 times a thickness of the at least one pin.

10. The airfoil of claim 1 wherein the asymmetry for the at least one pin includes a non-constant cross-sectional area relative to the pin centerline.

11. The airfoil of claim 1 wherein the asymmetry for the at least one pin includes a varying profile along the pin taken parallel to the pin centerline.

12. The airfoil of claim 11 where a profile of one leg of the two legs is rectilinear and the other leg of the two legs includes a profile that is rounded.

13. The airfoil of claim 1 wherein the outer wall at least partially forms the passage wall.

14. The airfoil of claim 1 wherein the asymmetry of the at least one pin is defined by differing volumes for the two legs.

15. The airfoil of claim 1 wherein the at least one pin includes a chevron-shaped body.

16. The airfoil of claim 1 wherein the cooling passage defines a passage centerline, and the pin centerline for the at least one pin is offset from the passage centerline.

17. The airfoil of claim 1 wherein the internal passage includes an inlet and an outlet provided on the at least one pin.

18. The airfoil of claim 17 wherein the inlet is provided on an upstream side of the pin and the outlet is provided on a downstream side of the pin relative to a flow of cooling fluid through the cooling passage.

19. A component for a turbine engine, component comprising:
an outer wall separating a cooling airflow from a hot airflow having a first surface facing the cooling airflow and a second surface facing the hot airflow;
a cooling circuit located within the component and comprising a passage wall with opposing sidewalls defining a cooling passage therebetween, and defining a passage centerline equidistant from the passage sidewalls; and
at least one pin spanning the cooling passage and having two legs each defining a leg axis and joined at a junction defining a pin centerline, and the at least one pin being asymmetrical relative to the pin centerline and having the pin centerline arranged along the passage centerline.

20. The component of claim 19 wherein the leg axes are not parallel.

21. The component of claim 20 wherein each leg axis defines a leg angle relative to the pin centerline, and the leg angles are unequal.

22. The component of claim 19 wherein the two legs include different lengths to define the asymmetry for the at least one pin.

23. The component of claim 19 wherein one leg of the two legs is curved as a curved leg to define the asymmetry for the at least one pin.

24. A method of cooling an engine component, the method comprising:
generating an asymmetrical turbulent flow by flowing a cooling fluid over at least one pin having two legs each defining a leg axis and joined at a junction defining a pin centerline, and the at least one pin being asymmetrical relative to the pin centerline; and
passing at least a portion of the cooling fluid through an interior passage within the at least one pin.

25. The method of claim 24 wherein the leg axes are not parallel.

26. The method of claim 24 wherein the each leg axis defines a leg angle relative to the pin centerline, and the leg angles are unequal.

* * * * *